US006751392B1

(12) United States Patent
Szilagyi et al.

(10) Patent No.: US 6,751,392 B1
(45) Date of Patent: Jun. 15, 2004

(54) CABLE MANAGEMENT SYSTEM FOR CONNECTOR ASSEMBLIES

(75) Inventors: B. Daniel Szilagyi, Naperville, IL (US); Scott Ernst, Plainfield, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/677,377

(22) Filed: Sep. 18, 2000

(51) Int. Cl.[7] .................................................. G02B 6/00

(52) U.S. Cl. ....................................... 385/134; 439/455

(58) Field of Search ............................ 385/53, 59, 134, 385/135, 136; 439/453, 455, 456, 465, 466, 467, 468, 473, 731

(56) References Cited

U.S. PATENT DOCUMENTS

| | | | | | |
|---|---|---|---|---|---|
| 4,549,780 | A | * | 10/1985 | Bertini et al. | 439/465 |
| 4,558,916 | A | * | 12/1985 | Hehl | 439/467 |
| 4,707,045 | A | * | 11/1987 | Ney et al. | 439/588 |
| 5,073,127 | A | * | 12/1991 | Daly et al. | 439/473 |
| 5,788,528 | A | * | 8/1998 | Orr, Jr. et al. | 439/358 |
| 5,831,815 | A | * | 11/1998 | Miller et al. | 361/679 |
| 6,161,282 | A | * | 12/2000 | Nieslony | 29/860 |
| 6,179,476 | B1 | * | 1/2001 | Besler et al. | 385/53 |
| 6,225,557 | B1 | * | 5/2001 | Fonteneau et al. | 174/50 |
| 6,295,401 | B1 | * | 9/2001 | Rutterman et al. | 385/114 |

* cited by examiner

*Primary Examiner*—Brian Sircus
*Assistant Examiner*—Thanh-Tam Le
(74) *Attorney, Agent, or Firm*—A. A. Tirva

(57) ABSTRACT

A cable management system is provided for a connector assembly. A housing has a plurality of passages for receiving the terminating ends of a plurality of cables. The passages open at a rear face of the housing. The cables have enlarged retention sections spaced from the terminating ends thereof. A backshell extends away from the rear face of the housing and includes an angled cavity within which the cables extend at an angle from the rear face of the housing. A plurality of retention recesses in the cavity capture the enlarged retention sections of the cables. The retention recesses are at varying locations in a direction longitudinally of the cables to accommodate the different locations of the passages from which the cables emanate.

19 Claims, 3 Drawing Sheets

CABLE MANAGEMENT SYSTEM FOR CONNECTOR ASSEMBLIES

FIELD OF THE INVENTION

This invention generally relates to the art of connector assemblies, such as fiber optic connector assemblies, electrical connector assemblies and the like, and particularly to a cable management system for such connector assemblies.

BACKGROUND OF THE INVENTION

A connector assembly, such as a fiber optic connector assembly or an electrical connector assembly, typically includes some form of housing which mates with a complementary mating connector such as an electrical connecting device or an optical fiber transmission device. The connector housing may terminate a plurality of cables which are to be interconnected with the complementary mating connector. For instance, the housing may include a plurality of passages for receiving ferrules terminated to the fiber cores of fiber optic cables or for receiving conductive terminals terminated to the conductors of a plurality of electrical cables.

The housings of such connector assemblies as described above typically include a rear face from which the cables emanate. With the ever-increasing miniaturization of the electronics and fiber optics in various industries, along with the accompanying miniaturization of connector assemblies as described above, considerable problems have been encountered in handling or managing the small cables which emanate from the connector housings. This is particularly true with angled connectors where the cables exit the rear face of a connector housing and extend at a right-angle away therefrom. The cables which often must be terminated at particular positions or passages in the housing tend to become commingled at the rear of the connector. The present invention is directed to solving these problems by providing a unique cable management system for such connector assemblies.

SUMMARY OF THE INVENTION

An object, therefore, of the invention is to provide a new and improved cable management system in a connector assembly, such as a fiber optic connector assembly which terminates a plurality of fiber optic cables or an electrical connector assembly which terminates a plurality of electrical cables.

In the exemplary embodiment of the invention, a connector housing has a front mating face, a rear face and a plurality of cable terminating passages extending therebetween. Each of a plurality of cables includes a terminating end for receipt in one of the cable terminating passages of the housing and an enlarged retention section spaced from the terminating end. The length of the cables between the terminating ends and the enlarged retention sections are generally equal. A backshell is mounted to the housing and extends away from the rear face thereof. The backshell includes a right-angled cavity within which the cables extend at a right-angle from the rear face of the housing. A plurality of retention recesses are provided in the cavity for capturing the enlarged retention sections of the cables. The retention recesses are at varying locations in a direction longitudinally of the cables to accommodate different locations of the passages from which the respective cables emanate.

As disclosed herein, the passages are in a linear array in the housing, and the retention recesses in the backshell are in a stepped array longitudinally of the cables. The backshell is a two-part structure and includes a base and a cover, with the right-angled cavity and the retention recesses being in the base. The enlarged retention sections of the cables comprise ring sections about the cables, such as crimp rings clamped onto the cables.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
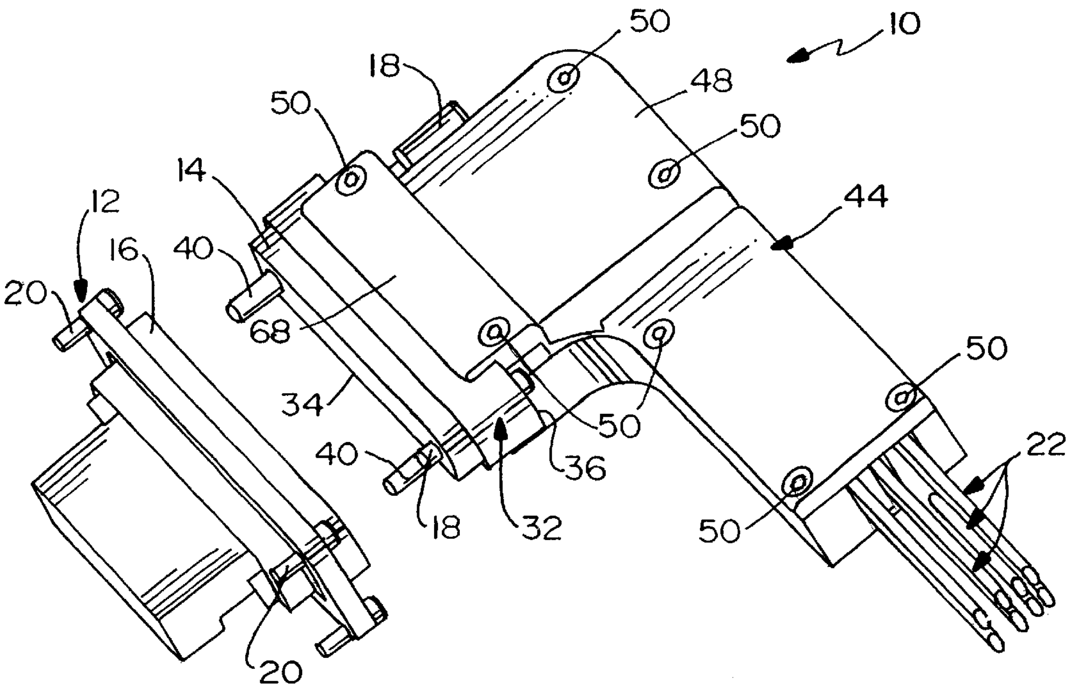
FIG. 1 is a perspective view of a connector assembly embodying the concepts of the invention, in conjunction with a complementary mating connector.

Referring to the drawings in greater detail, and first to FIG. 1, the invention is embodied in a fiber optic connector assembly, generally designated 10, which is mateable with a complementary mating fiber optic connector, generally designated 12. Connector assembly 10 includes a plug portion 14 which is insertable into a receptacle portion 16 of mating connector 12. One or more jack screws 18 on connector assembly 10 are threadable into topped holes (not shown) in the receptacle portion 16 to hold the connector assemblies in mated condition. Although not shown in the drawings, a plurality of fiber optic cables are terminated to mating connector 12.

Although the invention is disclosed herein as embodied in fiber optic connector assembly 10, the invention is equally applicable for electrical connectors terminated to discrete electrical cables. While a fiber optic cable includes one or more optical fiber cores, the electrical cables would include one or more electrical conductive wires.

Figure 2:
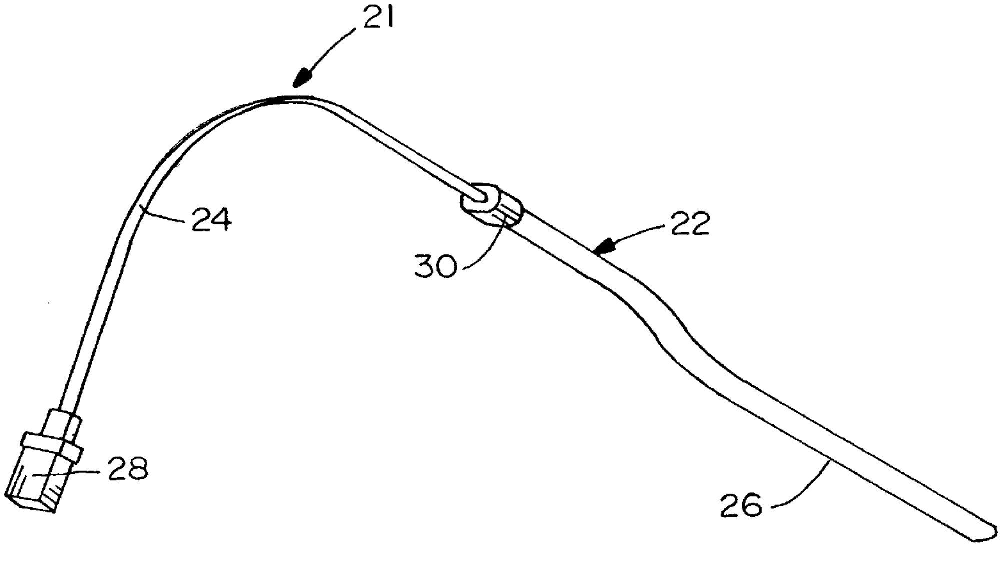
FIG. 2 is a perspective view of one of the plurality of cable harnesses terminated by the connector assembly.

FIG. 2 shows one of a plurality of fiber optic cable harnesses, generally designated 21, which are terminated by connector assembly 10. Each fiber optic cable harness 21 includes a fiber optic cable, generally designated 22, which includes a core ribbon 24 surrounded by an outer cladding or sheath 26 such as of plastic material. Core ribbon 24 includes a plurality of optical fibers or cores held together by an appropriate medium in a ribbon-like configuration. The optical fibers are terminated in a ferrule 28 as is known in the art. Sheath 26 is stripped or removed from core ribbon 24, and a metal crimp ring 30 is clamped onto the sheath at the point where the sheath terminates. For purposes of the invention, crimp ring 30 comprises an enlarged retention section of cable 22. All of cable harnesses 21 such as are seen in FIG. 1 are substantially identical, and the distance between ferrules 28 and crimp rings 30 are substantially equal for all of the harnesses. Therefore, the cable harnesses are fabricated or manufactured in substantial quantities for termination within fiber optic connector 10.

Figure 3:
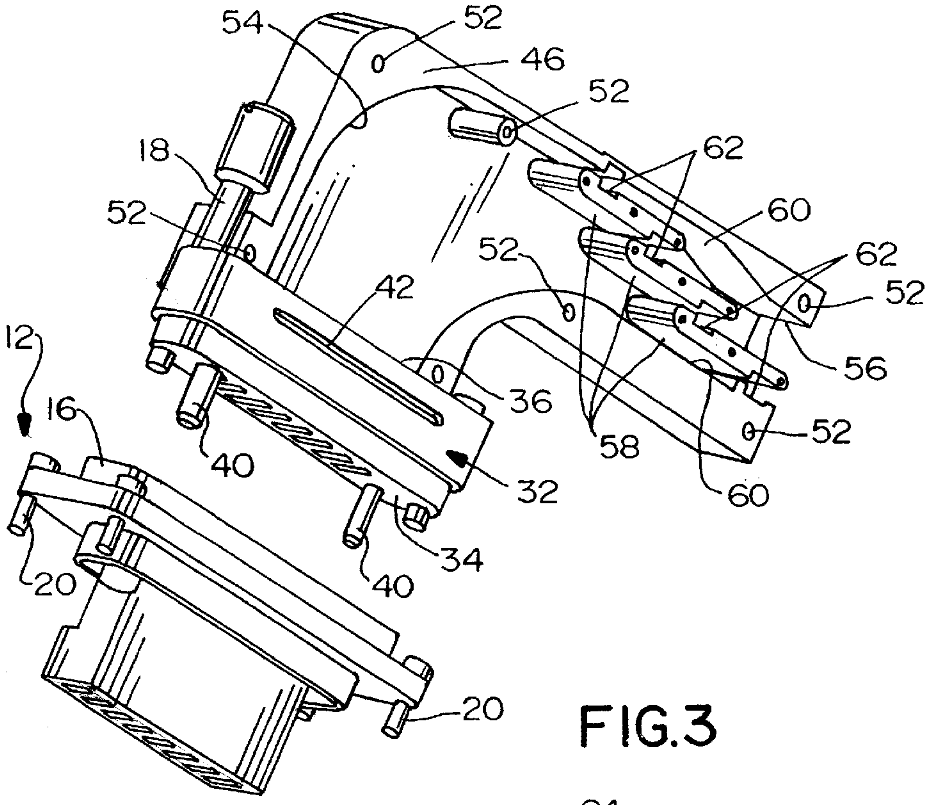
FIG. 3 is a view similar to that of FIG. 1, but with the cover of the backshell and the cable harnesses removed to show the interior cavity of the backshell.
Figure 4:
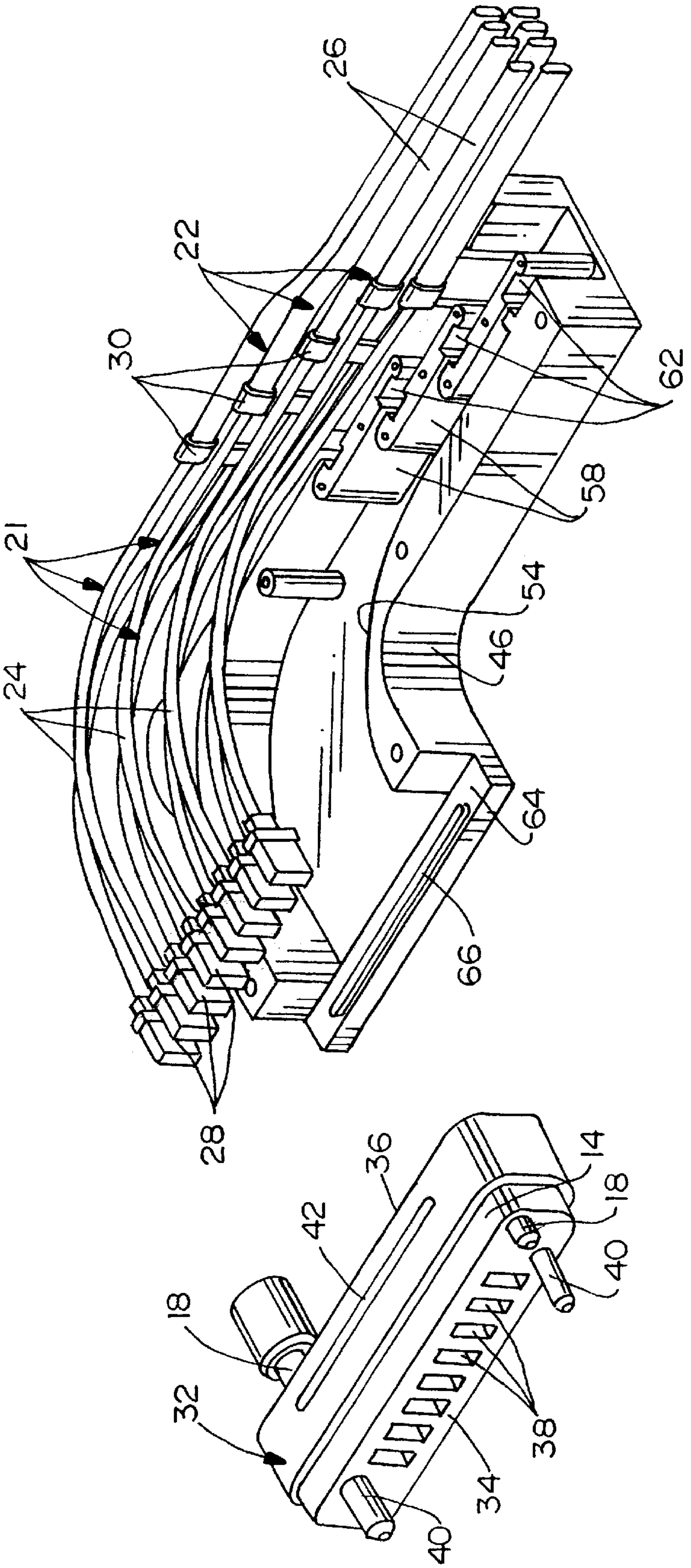
FIG. 4 is an exploded perspective view showing the base of the backshell removed from the connector housing, in conjunction with a plurality of the cable harnesses of FIG. 2.

Referring to FIGS. 3 and 4 in conjunction with FIG. 1, fiber optic connector assembly 10 includes a housing, generally designated 32, defining a front mating face 34 at the front of plug portion 14 and a rear face 36. A plurality of cable terminating passages 38 (FIG. 4) extend between front and rear faces 34 and 36, respectively. A pair of alignment pins 40 project forwardly of front mating face 34 and are insertable into a pair of alignment holes within receptacle portion 16 of mating connector 12. As best seen in FIG. 4, housing 32 is elongated, and cable terminating passages 38 are in a linear array. The housing may be fabricated of dielectric material, and an elongated groove 42 is formed along the top and the bottom of the housing. Jack screws 18 extend through the housing for securing connector assembly 10 to mating connector 12.

A right-angled backshell, generally designated 44 (FIG. 1), is secured to housing 32 and projects rearwardly therefrom. The backshell is a two-part structure, including a base 46 (FIG. 3) and a generally flat cover 48 (FIG. 1). The cover is secured to the base by a plurality of fasteners, such as screws 50 (FIG. 1), extending through the cover and threaded into a plurality of holes 52 (FIG. 3) in the base.

Figure 5:
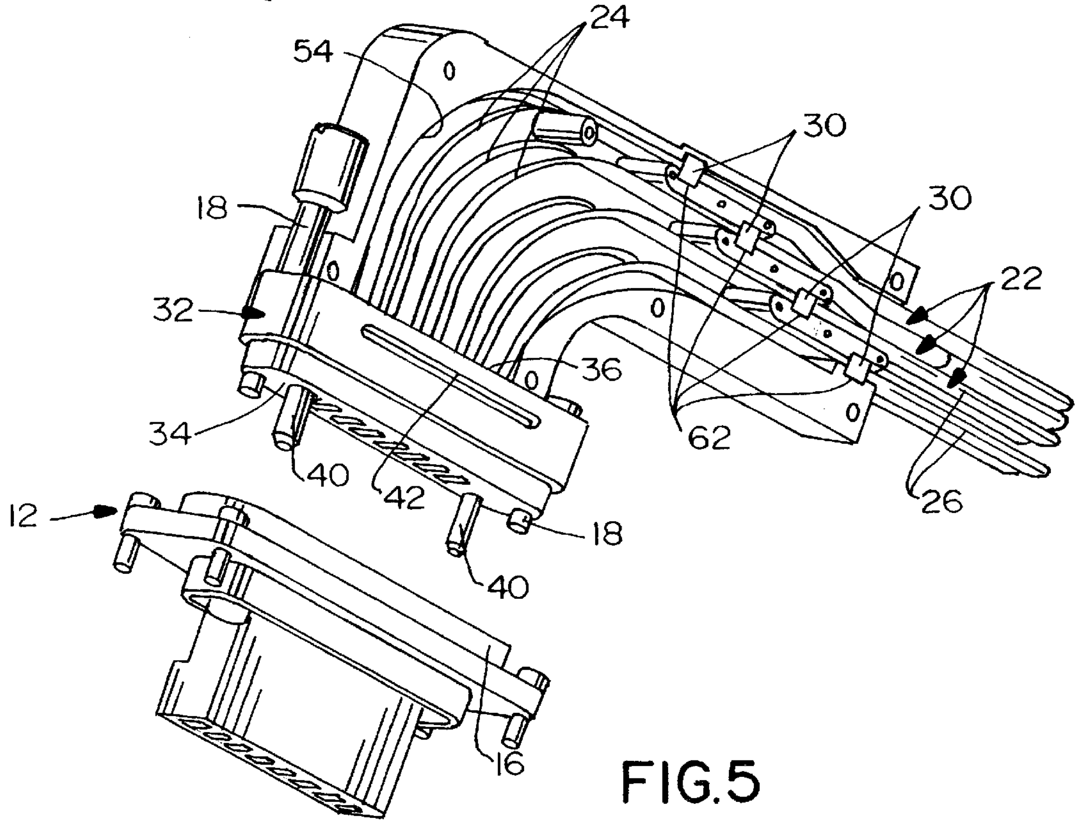
FIG. 5 is a view similar to that of FIG. 3, with the cable harnesses assembled to the connector assembly.

Referring particularly to FIG. 3, base 46 of backshell 44 includes a right-angled cavity 54 within which cables 22 extend, as seen in FIG. 5 and described hereinafter. Cavity 52 extends at a right-angle from rear face 36 of housing 32 to an exit opening 56 of the base. A plurality of walls or partitions 58 are provided within cavity 54 near exit opening 56 and combine with outside walls 60 of the base to define channels therebetween within which cables 22 are positioned. A plurality of retention recesses 62 are formed between walls or partitions 58 and outside walls 60 to define pockets within cavity 54 for capturing the enlarged retention sections of the cables defined by crimp rings 30 (FIG. 2). It can be seen most clearly in FIG. 3 that retention recesses or pockets 62 are in a stepped configuration.

Referring to FIG. 4, base 46 is shown to include a forwardly projecting lip 64 having an upwardly extending elongated flange 66. FIG. 1 shows that cover 48 of the backshell has a similar forwardly extending lip 68, and the lip of the cover also includes a downwardly extending elongated flange similar to flange 66, although the flange on the underside of lip 68 is not visible in the drawings. When backshell 44 is assembled to housing 32, lips 64 and 68 of the base and the cover, respectively, sandwich the housing therebetween, and the flanges (such as flange 66) are disposed in grooves 42 in the top and bottom of the housing. When the cover is secured to the base by fasteners 50, flanges 66 are securely captured within grooves 42 to hold the backshell secured to the housing as seen in FIG. 1.

FIG. 4 shows a plurality of the fiber optic cable harnesses 21 arranged with ferrules 28 in a generally linear array corresponding to the linear array of passages 38 in housing 32. Typically, a specific fiber optic cable harness 21 is specified for insertion into a specific one of the passages in the housing. Therefore, ferrules 28 are inserted into passages 38 one-at-a-time. As this termination process continues, without the invention, the small cables 22 have a tendency to become commingled or entangled, interfering with efficient termination of the cables within connector assembly 10. However, as seen in FIG. 5, the enlarged retention sections defined by crimp rings 30 of the cable harnesses are positioned within retention recesses 62 in an orderly fashion. For instance, an operator can insert the ferrule 28 (FIG. 4) of one of the cable harnesses 21 into its respective passage 38 in the housing, and immediately insert the enlarged retention section 30 into a respective one of the retention recesses 62. That terminated cable now is secure and will not become entangled with further terminations of the other cables. This procedure continues until all of the cables have been terminated. With each terminated cable being progressively secured and in place as the operator sequentially inserts the ferrules into the passages, a rapid and efficient termination process is afforded by the invention.

As best seen in FIGS. 3–5, retention recesses 62 are in a stepped array within cavity 54. This stepped array accommodates the linear array of passages 38 within the housing. In other words, with the distance between ferrules 28 and crimp rings 30 of cable harnesses 21 being equal, the stepped array coincides with the varying progressive distances that core ribbons 24 are bent around the right-angular configuration of cavity 54.

Finally, it should be noted that there are eight passages 38 shown in housing 32, whereas there are only four retention recesses 62 in cavity 54 of the backshell base. As seen in FIG. 5, two core ribbons 24 emanate from each retention recess 62. This is allowed because cavity 54 is deep enough and partitions 58 (FIG. 3) are high enough to allow two cables to be stacked on top of each other within each channel between the partitions and with two enlarged retention sections or crimp rings 30 on top of each other within each retention recess 62.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A cable management system in a connector assembly, comprising:

a housing having a front mating face, a rear face and a plurality of cable terminating passages extending therebetween;

a plurality of cables each including a terminating end for receipt in one of the cable terminating passages of the housing and an enlarged retention section spaced from the terminating end, the lengths of the cables between the terminating ends and the enlarged retention sections being generally equal; and a backshell mounted to the housing and extending away from the rear face thereof, the backshell including a right-angled cavity within which the cables extend at a right-angle from the rear face of the housing, and a plurality of retention recesses in the cavity for capturing the enlarged retention sections of the cables, the retention recesses being at varying locations in a direction longitudinally of the cables to accommodate the different locations of the passages from which the respective cables emanate.

2. The cable management system of claim 1 wherein said passages are in a linear array and said retention recesses in the backshell are in a stepped array longitudinally of the cables.

3. The cable management system of claim 1 wherein said backshell includes a base and a cover.

4. The cable management system of claim 3 wherein said retention recesses are in the base of the backshell.

5. The cable management system of claim 4 wherein said right-angled cavity is substantially in the base of the backshell.

6. The cable management system of claim 1 wherein said enlarged retention sections of the cables comprise ring sections about the cables.

7. The cable management system of claim 6 wherein said ring sections comprise crimp rings clamped onto the cables.

8. The cable management system of claim 1 wherein said cables comprise fiber optic cables, and the terminating ends of the cables comprise ferrules terminated to fiber cores of the cables.

9. A cable management system in a connector assembly, comprising:

a housing having a front mating face, a rear face and a plurality of cable terminating passages extending in a linear array therebetween;

a plurality of cables each including a terminating end for receipt in one of the cable terminating passages of the housing and an enlarged retention section spaced from the terminating end, the lengths of the cables between the terminating ends and the enlarged ring sections being generally equal; and a backshell mounted to the housing and extending away from the rear face thereof, the backshell including a base and a cover with a right-angled cavity substantially in the base and within which the cables extend at a right-angle from the rear face of the housing, and a plurality of retention recesses in the cavity in the base for capturing the enlarged retention sections of the cables, the retention recesses being in a stepped array longitudinally of the cables to accommodate the different locations of the linear array of passages from which the respective cables emanate.

10. The cable management system of claim 9 wherein said enlarged retention sections comprise crimp rings clamped onto the cables.

11. The cable management system of claim 9 wherein said cables comprise fiber optic cables, and the terminating ends of the cables comprise ferrules terminated to fiber cores of the cables.

12. A cable management system in a connector assembly for terminating a plurality of cables each including a terminating end and an enlarged retention section spaced a given distance from the terminating end, comprising:

a housing having a plurality of passages for receiving the terminating ends of the cables, the passages opening at a rear face of the housing; and a backshell extending away from the rear face of the housing and including an angled cavity within which the cables extend at an angle from the rear face of the housing, and a plurality of retention portions in the cavity for engaging the enlarged retention sections of at least some of the cables, the retention portions being at varying locations in a direction longitudinally of the cables to accommodate the different locations of the passages from which the respective cables emanate.

13. The cable management system of claim 12 wherein said passages are in a linear array and said retention portions in the backshell are in a stepped array longitudinally of the cables.

14. The cable management system of claim 12 wherein said backshell includes a base and a cover.

15. The cable management system of claim 14 wherein said retention portions are in the base of the backshell.

16. The cable management system of claim 15 wherein said right-angled cavity is substantially in the base of the backshell.

17. The cable management system of claim 12 wherein said enlarged retention portions of the cables comprise ring sections about the cables.

18. The cable management system of claim 17 wherein said ring sections comprise crimp rings clamped onto the cables.

19. The cable management system of claim 12 wherein said cables comprise fiber optic cables, and the terminating ends of the cables comprise ferrules terminated to fiber cores of the cables.

* * * * *